US010645915B2

(12) United States Patent
McGavin (10) Patent No.: US 10,645,915 B2
(45) Date of Patent: May 12, 2020

(54) INSECT TRAP (71) Applicant: Kory McGavin, Whitefish, MT (US)

(72) Inventor: Kory McGavin, Whitefish, MT (US)

( * ) Notice: Subject to any disclaimer, the term of this patent is extended or adjusted under 35 U.S.C. 154(b) by 159 days.

(21) Appl. No.: 15/620,768

(22) Filed: Jun. 12, 2017

(65) Prior Publication Data
US 2018/0042212 A1 Feb. 15, 2018

Related U.S. Application Data

(63) Continuation-in-part of application No. 29/573,968, filed on Aug. 11, 2016, now Pat. No. Des. 812,183.

(51) Int. Cl.
| *A01M 1/10* | (2006.01) |
| *A01M 1/04* | (2006.01) |
| *A01M 1/02* | (2006.01) |
| *A01N 31/02* | (2006.01) |
| *A01N 35/06* | (2006.01) |
| *A01N 27/00* | (2006.01) |
| *A01N 35/04* | (2006.01) |
| *A01N 31/06* | (2006.01) |
| *A01N 25/00* | (2006.01) |

(52) U.S. Cl.
CPC ............ *A01M 1/106* (2013.01); *A01M 1/023* (2013.01); *A01M 1/04* (2013.01); *A01N 25/006* (2013.01); *A01N 27/00* (2013.01); *A01N 31/02* (2013.01); *A01N 31/06* (2013.01); *A01N 35/04* (2013.01); *A01N 35/06* (2013.01)

(58) Field of Classification Search
CPC ........ A01M 1/106; A01M 1/023; A01M 1/02; A01M 1/10; A01N 25/006; A01N 27/00; A01N 35/04; A01N 31/06

USPC .......................................................... 43/107
See application file for complete search history.

(56) References Cited

U.S. PATENT DOCUMENTS

| 1,366,059 A | * | 1/1921 | Miller | ..................... | A01M 1/02 |
| | | | | | 43/118 |
| 1,772,729 A | * | 8/1930 | Giulio | ..................... | A01M 1/10 |
| | | | | | 43/107 |
| 1,787,421 A | * | 12/1930 | Ruddell | .................. | A01M 1/02 |
| | | | | | 43/107 |

(Continued)

FOREIGN PATENT DOCUMENTS

| GB | 212429 A | * | 3/1924 | ............. | A01M 1/02 |
| GB | 342863 A | * | 2/1931 | ............. | A01M 1/08 |

(Continued)

OTHER PUBLICATIONS

Pittalwala, Iqbal, "How Mosquitoes Are Drawn to Human Skin and Breath", Retrieved At: <<https://ucrtoday.ucr.edu/19377>>, Dec. 5, 2013, 3 pages.

(Continued)

*Primary Examiner* — Christopher P Ellis
(74) *Attorney, Agent, or Firm* — Medley, Behrens & Lewis, LLC (57) ABSTRACT

An insect trap is provided with a bottle for holding insects and a conically-shaped insert for insertion into the bottle The insert includes holes for permitting light and visibility. The trap and/or trap insert may be made from a plastic or a polymer. Further, insect attracting scents may be injected or impregnated into the plastic or polymer. A chemical exhibiting phosphorescence or photoluminescence may also be combined with the plastic and/or polymer.

19 Claims, 10 Drawing Sheets

(56) References Cited

U.S. PATENT DOCUMENTS

| | | | | |
|---|---|---|---|---|
| 1,865,713 A * | 7/1932 | Taylor | A01M 1/02 | 43/107 |
| 1,867,252 A * | 7/1932 | Crigler | A01M 1/02 | 43/121 |
| 2,478,104 A * | 8/1949 | Johnson | A01M 1/02 | 43/122 |
| 2,997,806 A * | 8/1961 | Duvall | A01M 1/02 | 43/121 |
| 4,058,928 A * | 11/1977 | Digman, Sr. | A01M 1/02 | 43/131 |
| 4,501,088 A * | 2/1985 | Boisvert | A01M 1/02 | 43/118 |
| 4,638,592 A * | 1/1987 | Schneidmiller | A01M 1/02 | 426/1 |
| 4,706,410 A * | 11/1987 | Briese | A01M 1/02 | 43/107 |
| 4,823,502 A * | 4/1989 | Tucker | A01K 85/00 | 43/42.33 |
| 4,873,787 A * | 10/1989 | Schneidmiller | A01M 1/02 | 43/122 |
| 5,172,513 A * | 12/1992 | Reibling | A01M 1/02 | 43/107 |
| 5,226,254 A * | 7/1993 | MacMenigall | A01M 1/10 | 43/107 |
| 5,231,791 A * | 8/1993 | Falkson | A01M 1/02 | 43/107 |
| 5,243,781 A * | 9/1993 | Carter | A01M 1/02 | 426/1 |
| 5,309,668 A * | 5/1994 | Barton | A01M 1/10 | 43/121 |
| 5,339,563 A * | 8/1994 | Job | A01M 1/00 | 43/107 |
| 5,392,560 A * | 2/1995 | Donahue | A01M 1/02 | 43/107 |
| 5,452,540 A * | 9/1995 | Dowd | A01M 1/02 | 43/107 |
| 5,522,171 A * | 6/1996 | Mandeville | A01M 1/02 | 43/107 |
| 5,557,880 A * | 9/1996 | Schneidmiller | A01M 1/02 | 43/107 |
| 5,713,153 A * | 2/1998 | Cook | A01M 1/02 | 43/114 |
| 6,158,165 A * | 12/2000 | Wilson | A01M 1/02 | 43/100 |
| 6,158,166 A * | 12/2000 | Snell | A01M 1/026 | 43/121 |
| 6,532,695 B1 * | 3/2003 | Alvarado | A01M 1/106 | 43/107 |
| 6,637,149 B1 * | 10/2003 | Bauer | A01M 1/02 | 43/107 |
| 7,412,797 B1 * | 8/2008 | Hiscox | A01M 1/02 | 43/107 |
| 2004/0001870 A1 * | 1/2004 | Durand | A01M 1/02 | 424/405 |
| 2004/0231229 A1 * | 11/2004 | Lenker | A01M 1/02 | 43/107 |
| 2006/0137240 A1 * | 6/2006 | Dismore | A01M 1/10 | 43/107 |
| 2007/0256351 A1 * | 11/2007 | Milton | A01M 1/023 | 43/139 |
| 2008/0263938 A1 * | 10/2008 | Schneidmiller | A01M 1/106 | 43/122 |
| 2009/0071060 A1 * | 3/2009 | McKay | A01M 1/106 | 43/122 |
| 2009/0151227 A1 * | 6/2009 | Schneidmiller | A01M 1/106 | 43/121 |
| 2009/0151228 A1 * | 6/2009 | Schneidmiller | A01M 1/106 | 43/122 |
| 2009/0183290 A1 * | 7/2009 | Palarino | A42B 1/00 | 2/4 |
| 2011/0078943 A1 * | 4/2011 | Larsen | A01M 1/145 | 43/113 |
| 2011/0117156 A1 * | 5/2011 | Lin | A61L 9/01 | 424/409 |
| 2012/0117855 A1 * | 5/2012 | Miller | A01M 1/02 | 43/121 |
| 2012/0151822 A1 * | 6/2012 | Schneidmiller | A01M 1/106 | 43/107 |
| 2012/0204475 A1 * | 8/2012 | Schneidmiller | A01M 1/04 | 43/113 |
| 2012/0294828 A1 * | 11/2012 | Zhang | A01M 1/106 | 424/84 |
| 2013/0152452 A1 * | 6/2013 | Lazzarini | A01M 1/02 | 43/114 |
| 2013/0212926 A1 * | 8/2013 | McGavin | A01M 1/106 | 43/107 |
| 2016/0000060 A1 * | 1/2016 | Sandford | A01M 1/02 | 43/113 |
| 2016/0262367 A1 * | 9/2016 | Sandford | A01M 1/145 | |
| 2017/0000101 A1 * | 1/2017 | Gaugler | A01M 1/165 | |
| 2018/0042212 A1 * | 2/2018 | McGavin | A01N 25/006 | |
| 2018/0213765 A1 * | 8/2018 | Liang | A01M 1/02 | |
| 2018/0242591 A1 * | 8/2018 | Amick | A01N 49/00 | |

FOREIGN PATENT DOCUMENTS

| | | | | |
|---|---|---|---|---|
| GB | 365231 A * | 1/1932 | | A01M 1/02 |
| GB | 2274969 A * | 8/1994 | | A01M 1/02 |
| GB | 2328135 A * | 2/1999 | | A01M 1/10 |

OTHER PUBLICATIONS

Eneh, et al., "Cedrol, A Malaria Mosquito Oviposition Attractant is Produced by Fungi Isolated From Rhizomes of the Grass Cyperus Rotundus", In Malaria Journal, vol. 15, 4 pages.

* cited by examiner

FIG. 1A

Table 1
Putative kairomones selected for EAG study of Simulium spp.

| Class of Compound | Compound | Name Identified from [reference] | Attractive to [reference] |
|---|---|---|---|
| Carboxylic Acids | Heptanoic acid* | Groin (human) | — |
| | Lactic acid* | Arms & Armpit (human) [19] | Anopheles gambiae [19] |
| | Octanoic acid | Sweat & Feet (human) [20], [38], [51] | — |
| | Hexanoic acid | Sweat, Feet (human) & Rumen (bovine) [30], [38], [45], [51] | Stomoxys calcitrans, An. gambiae [30], [45] |
| | Nonanoic acid* | Sweat, Skin & Groin (human) [20], [38] | — |
| | Isobutyric acid | Sweat, Feet (human) & Rumen (bovine), [20], [45], [51] | S. calcitrans [20], [45], [51] |
| | 4-Methoxybenzoic acid* | Armpits (human) | — |
| | DL-Serine | Armpits & forehead (human) [52] | — |
| | Tetradecanoic acid | Sweat & Skin (human) [20], [38] | — |
| | Octadecanoic acid | Sweat (human) [20] | — |
| | Hexadecanoic acid | Sweat & Skin (human) [20], [38] | — |
| | Adipic acid | Skin (human) [38] | — |
| | Isophthalic acid* | Armpits (human) | — |
| | Isovaleric acid | Feet (human) & Rumen (bovine) [45], [51] | S. calcitrans [45], [51] |
| | Propionic acid | Feet (human) & Rumen (bovine) [30], [45], [51] | S. calcitrans, An. gambiae [30], [45], [51] |
| | Butyric acid | Sweat, Feet (human) & Rumen (bovine) [30], [45], [51] | S. calcitrans, An. gambiae [30], [45], [51] |
| | Pentadecanoic acid | Sweat (human) [20], [38] | — |
| | Decanoic acid | Sweat & Feet (human) [20], [38], [51] | — |
| | Undecanoic acid* | Armpits (human) | — |

FIG. 1B

| | | |
|---|---|---|
| Tridecanoic acid | Sweat & Skin (human) [20], [38] | — |
| Linoleic Acid* | Armpits & Groin (human) | — |
| 2-Methylhexanoic acid* | Armpits (human) | — |
| Oleic Acid | Sweat (human) [20] | — |
| Alcohols Tetrahydrofurfuryl alcohol | Skin (human) [38] | |
| 3-Octanol | Rumen (human), [45], [53] | S. calcitrans [45] |
| 1-Octen-3-ol | Feet (human), Rumen (bovine) & Fungal [45], [51], [53] | |
| 2-Ethyl-1-hexanol | Rumen (bovine) [45] | S. calcitrans [45] |
| cis-3-Hexen-1-ol | Rumen (bovine) [45] | S. calcitrans [45] |
| 1-Octanol | Rumen (bovine) [45] | S. calcitrans [45] |
| 1-Decanol* | Groin (human) | — |
| 1-Heptadecanol* | Armpits (human) | — |
| 1-Pentadecanol* | Armpits & Groin (human) | — |
| 1-Tetradecanol* | Groin (human) | — |
| 2,4,4-Trimethyl-1-pentanol* | Armpits (human) | — |
| 1-Octadecanol* | Armpits (human) | — |
| Aldehydes Nonanal* | Armpits, (human) bovine & rabbit [36], [38], [52] | Amblyomma variegatum, Culex quinquefasciatus [52] [36] |
| Hexanal* | Armpits (human) bovine & rabbit [38], [52] | Am. variegatum [52] |
| Tetrahydro-2-furancarboxaldehyde* | Skin (human), bovine & rabbit [38], [52] | Am. variegatum [52] |
| Decanal* | Armpits, Forearm (human) & Rumen (bovine) [30], [36], [38], [45] | Stomoxys calcitrans, Cx. quinquefasciatus, An. gambiae [30], [36], [45] |
| 1-Pentadecanal | Armpits (human) | — |
| Alkanes Pentadecane* | Groin (human) | — |
| Undecane | Breath (human) [43] | — |
| Heptadecane | Skin (human) [38] | — |
| Hexadecane* | Armpits & Groin (human) | — |
| Ketones (+/-)-Dihydrocarvone | Rumen (bovine) [45] | S. calcitrans [45] |
| Methyl acetoacetate* | Armpits (human) | — |
| 6-Methyl-3-hepten-2-one* | Sweat (human) & Rumen (bovine) [30], [45] | S. calcitrans, An. gambiae [30], [45] |
| 6,10-Dimethyl-5,9-undecadien-2-one | Skin (human) [38] | — |
| Sodium pyruvate | Armpits & Forehead (human) [52] | — |
| 4-Methoxy-2H-chromen-2-one* | Armpits (human) | — |
| Acetophenone | Rumen (bovine) Breath (human) [45] [43], [12] | S. calcitrans [43], [45] [12] |
| Others 3,6-Dimethylphthalic anhydride* | Armpits (human) | — |
| 3-Methyl indole* | Groin (human) | — |
| R-(+)-Limonene | Rumen (bovine) & Breath (human) [43], [45] | S. calcitrans [43], [45] |
| Cedryl acetate* | Armpits (human) | — |
| Urea* (ammonia) | Armpits & Forehead (human) [54] | Aedes aegypti [48] |

INSECT TRAP

CROSS-REFERENCE TO RELATED APPLICATION(S)

The present application claims priority to U.S. Design patent application Ser. No. 29/573,968 filed on Aug. 11, 2016, entitled "Bottle Mounted Flying Insect Trap" the entire disclosure of which is incorporated by reference herein.

BACKGROUND OF THE INVENTION

1. Field of Invention

The present invention relates to the field of traps for insects, and in particular traps for disease-carrying insects or annoying nuisance insects, that may be inserted in pre-existing containers, such as plastic bottles and containers.

2. Description of Related Art

Disease vectors are biting or stinging insects that carry and transmit a pathogen into another living organism. Vector-borne diseases account for more than 17% of all infectious diseases, causing more than 1 million deaths annually. For example, more than 2.5 billion people in over 100 countries are at risk of contracting dengue alone, and malaria causes more than 400 000 deaths every year globally, most of them children under 5 years of age. Other diseases such as Chagas disease, leishmaniasis and schistosomiasis affect hundreds of millions of people worldwide. Many of these diseases are preventable through informed protective measures.

Vectors are living organisms that can transmit infectious disease pathogens between humans or from animals to humans. Many of these vectors are bloodsucking insects, which ingest disease-producing microorganisms during a blood meal from an infected host (human or animal) and later inject it into a new host during their subsequent blood meal.

Mosquitoes are the best-known disease-carrying vector. Others include ticks, flies, sand flies, fleas, triatomine bugs and some freshwater aquatic snails.

Examples of mosquito-borne diseases include Chikungunya, Dengue fever, Rift Valley fever, Yellow fever, Zika, Malaria, Culex, Japanese encephalitis, Lymphatic filariasis, and West Nile fever. Examples of sand fly-carried diseases include Leishmaniasis and Sandfly fever (phelebotomus fever). Examples of tick-carried diseases include Crimean-Congo haemorrhagic fever, Lyme disease, Relapsing fever (borreliosis), Rickettsial diseases (spotted fever and Q fever), Tick-borne encephalitis, and Tularaemia. Triatomine bugs transmit parasites causing Chagas disease (American trypanosomiasis). An example of tsetse fly-carried disease includes Sleeping sickness (African trypanosomiasis). Examples of flea-carried diseases include Plague (transmitted by fleas from rats to humans) and Rickettsiosis. An example of a black fly-carried disease includes Onchocerciasis (river blindness). Aquatic snails are responsible for Schistosomiasis (bilharziasis).

Vector-borne diseases are illnesses caused by pathogens and parasites in human populations. Every year there are more than 1 billion cases and over 1 million deaths from vector-borne diseases such as malaria, dengue, schistosomiasis, human African trypanosomiasis, leishmaniasis, Chagas disease, yellow fever, Japanese encephalitis and onchocerciasis, globally. Vector-borne diseases account for over 17% of all infectious diseases. Geographic distributions of these diseases are determined by complex dynamics of vector populations interacting to environmental and social factors.

Globalization of travel and trade, unplanned urbanization and environmental challenges such as climate change are having a significant impact on disease transmission in recent years. Some diseases, such as dengue, chikungunya, Zika, and West Nile virus, are emerging in countries where they were previously unknown. Changes in agricultural practices due to variation in temperature and rainfall can affect the transmission of vector-borne diseases. Climate information can be used to monitor and predict distribution and longer-term trends in malaria and other climate-sensitive diseases, and access to water and sanitation is a very important factor in disease control and elimination, as climate and sanitation are factors affecting vector populations.

Especially in insect-rich areas, the human desire to control insect populations has existed. Mosquitoes are among the most annoying insects, and the most desirable to control. Mosquitoes produce itchy red bites, create annoying buzzing sounds, and may carry pathogens causing diseases like malaria, dengue, Zika, West Nile virus, chikungunya, yellow fever, filariasis, Japanese encephalitis, Saint Louis encephalitis, Western equine encephalitis, Eastern equine encephalitis, Venezuelan equine encephalitis, and La Crosse encephalitis.

Humans have also tried to control populations of houseflies, which carry disease and tend to land on our food, and wasps, which are aggressive and produce painful stings when angered.

Control of insects is particularly desirable in temperate climates when individual humans or families have been indoors all winter and want to enjoy time outdoors in the summer Not long after winter, when the snow melt water has pooled, the insects start to harass humans that are trying to enjoy fresh air. In tropical and sub-tropical areas, insects are a year-round problem.

In the prior art, there have been many attempts to curb insect populations such as bug-zappers that use ultraviolet light to attract the insects and an electrified grating to kill them. Sticky strips work for flies and wasps that are attracted to sweet flavors, wherein the sticky substance has an aroma of a sweet flavor, and adheres to the leg or wing of an insect that comes near to consume it.

Lethal ovitraps are devices that attract gravid female container-breeding mosquitoes and kill them. The traps halt the insect's life cycle by killing adult insects and stopping reproduction. Lethal ovitraps can either contain substances that kills larvae that hatch from eggs laid in the traps (larvicidal ovitraps), or substances that kill the adult mosquito when she enters, along with any larva that may hatch (adulticidal ovitraps). One example in the industry comprises a large, five gallon bucket, is somewhat complicated to use and clean. It uses a sticky tape to trap the mosquito.

Other compounds have been used to repel, but not kill, insects. Citronella candles keep mosquitoes away by masking scents that are attractive to them, such as carbon dioxide and lactic acid.

DEET and picaridin are present within lotions and sprays to apply to the body to prevent mosquito bites. There are some objections to the use of DEET, as it is a toxic chemical that has a strong smell and repulsive taste.

Insect traps are intended to retain, but not necessarily kill, the insect. There are a variety of insect traps on the market used to capture insects both indoors and outdoors. The vast majority of traps on the market are for outdoor use and use harsh smelling attractants, chemicals and sticky glues to capture insects. The indoor traps are typically made of thick stock paper with sticky glues, chemical foggers that fill space with chemicals that kill insects, or sticky glues that are hung around homes or stuck to surfaces that insects randomly land on and become stuck. However, chemical foggers are harmful to humans in the environment and sticky glues and paper are messy and inhumane.

Based on the foregoing, there is a need in the art for a non-toxic insect trap to effectively trap the most annoying insects, and prevent them from annoying people and spreading disease.

SUMMARY OF THE INVENTION

An insect trap is provided including an enclosure for holding insects and a conically-shaped insert for insertion into the enclosure. The insert includes apertures and a frusto-conical end. In one or more embodiments, the trap and/or trap insert may be made from a plastic or a polymer. Insect attracting scents may be injected or impregnated into the plastic or polymer. In one or more embodiments, a chemical exhibiting phosphorescence or photoluminescence material may be combined with the plastic and/or polymer.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 1A-B is a table of chemicals that are attractive to vectors, according to an embodiment of the present invention;

DETAILED DESCRIPTION OF PREFERRED EMBODIMENTS

Preferred embodiments of the present invention and their advantages may be understood by referring to FIGS. 1-9, wherein like reference numerals refer to like elements.

Figure 3:
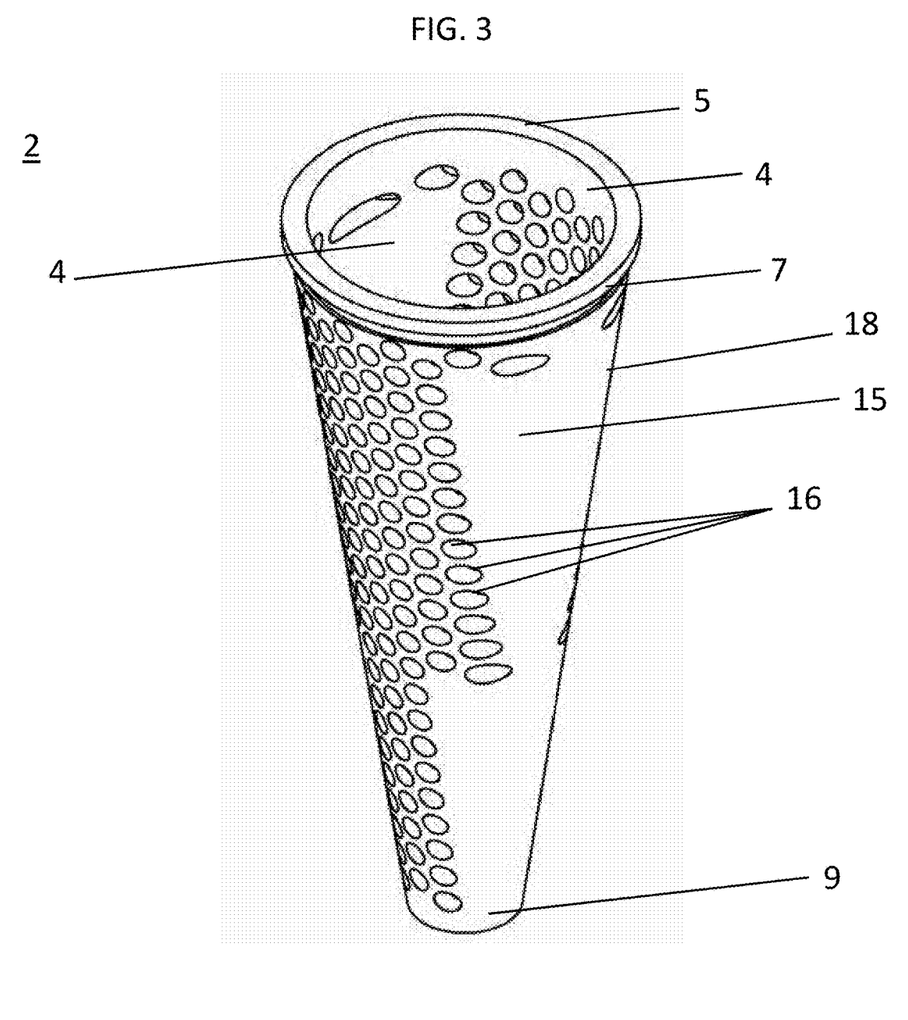
FIG. 3 is a perspective view of the insect trap showing attraction responses of vectors, according to an embodiment of the present invention.
Figure 4:
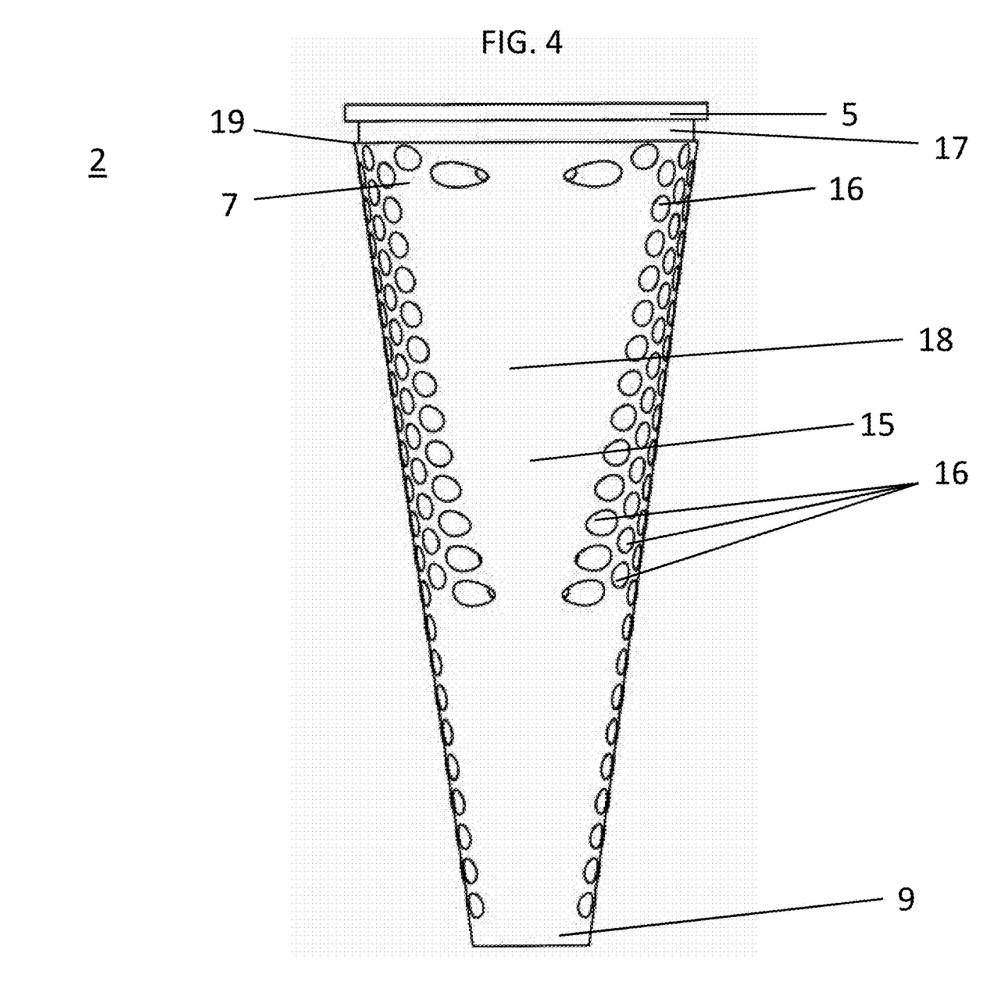
FIG. 4 is an elevation view of the insect trap, according to an embodiment of the present invention.

With reference to FIGS. 3 and 4, in an embodiment the insect trap 2 is conical in shape, with an upper opening 4 defined by an upper lip 5 at the top 7 of the trap. At the bottom 9 of the trap is a lower opening 10 (shown in FIG. 6), smaller in diameter than the upper opening 4, also defined by a lower lip 12. The body 15 of the trap has a frusto-conical end which is decreasing in diameter to the bottom 9 of the trap. The sidewalls 18 of the body 15 are perforated with a plurality of apertures 16. The angle of the cone can vary as wells the length of the cone either longer or shorter depending on the size of the cavity and the target insect. In an embodiment, the entry opening and end opening of said cone should reflect a ratio of approximately 3 to 1 sizing, meaning an 38 mm entry opening would have approximately a 13 mm end opening. Other cone dimensional ratios are possible, from a longer, more slowly tapering cone to a shorter, more sharply tapered cone. Hole sizes in the smaller and larger cones would not change just increase or decrease in number to accommodate the container and the type of insect that is desirable. For example, a larger end opening would be used for a wasp than for a mosquito, and similarly the holes in the side of the cone would be small enough to prevent the escape of whatever insect the cone is designed to trap.

In an embodiment, the apertures 16 are selectively positioned to permit the insect to see inside the bottle but the sidewalls 18 are not entirely perforated.

In an embodiment, the collar 17 of the top 9 of the trap is sized to provide a friction fit within the bottle opening 22 (shown in FIG. 6) and ledge 19 projects from the sidewalls 18 to engage with the interior of the bottle opening 22 (shown in FIG. 6), wherein the ledge 19 compresses as the trap 2 is inserted into the bottle opening 22.

The body 15 of the trap 2 may be conceptually separated into four quarters, each quarter representing a quarter circumference and extending from top 7 to bottom 9. In an embodiment, the apertures 16 on the walls 18 continue from top to bottom on two opposite quarters, but the intervening quarters are solid. The cone is designed to have a plurality of holes to allow for light and air transfer thus making the cavity opening more interesting and inviting as well as allowing for the fragrance from our bait lure to be more detectable. Some insects are curious by nature and having the plurality of holes is helpful in enticing them into and down the cone. In an embodiment, the cone traps may be efficiently manufactured by injection molding.

Figure 5:
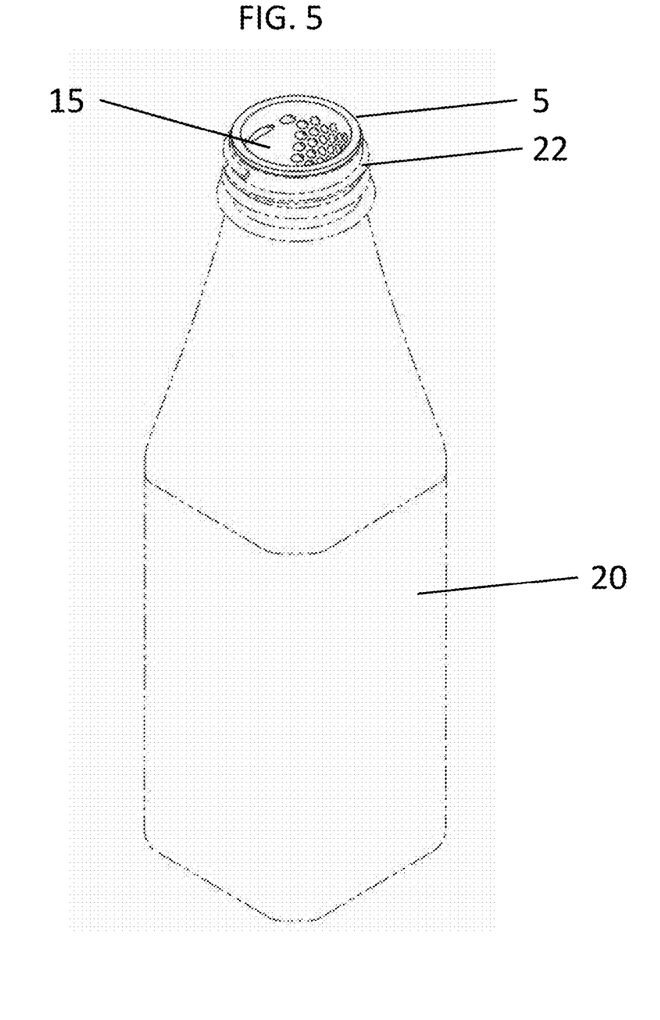
FIG. 5 is a perspective view of the insert trap within a bottle, according to an embodiment of the present invention.
Figure 6:
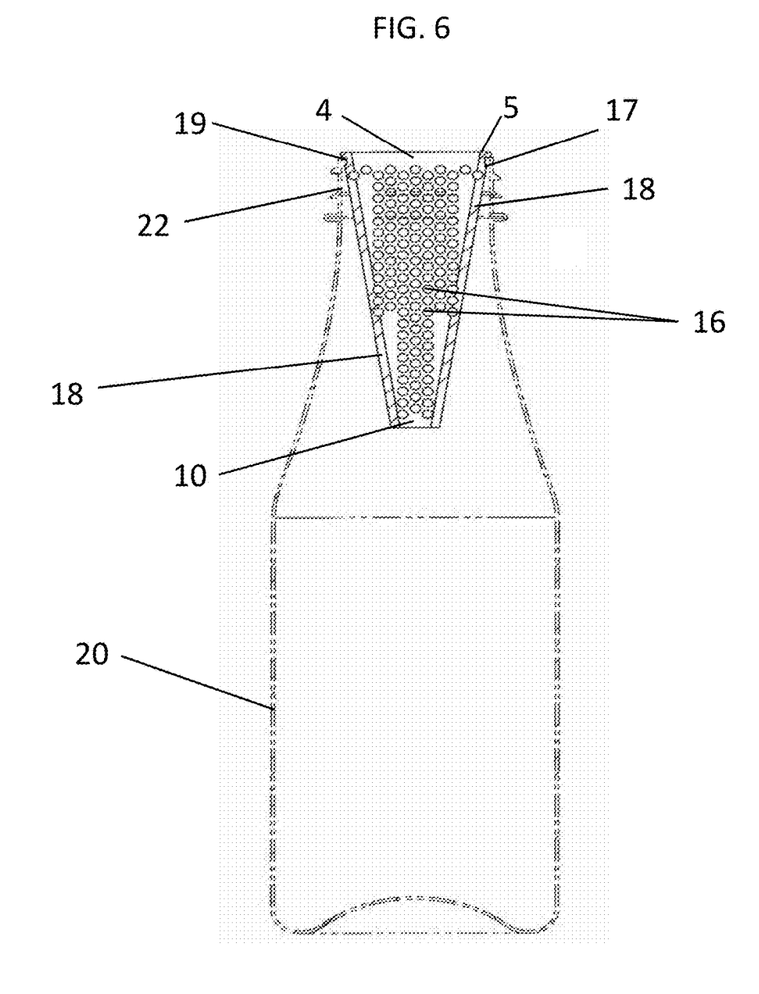
FIG. 6 is an elevation view of the insect trap within a bottle, according to an embodiment of the present invention.
Figure 7:
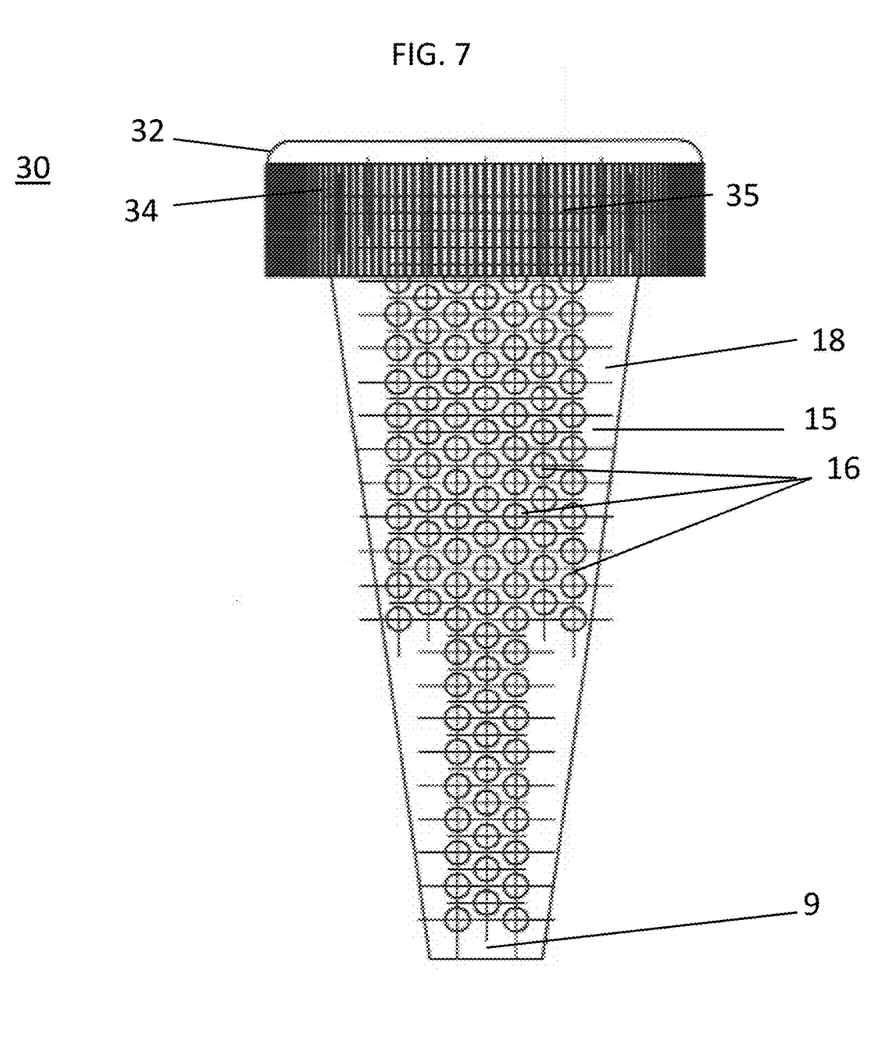
FIG. 7 is an elevation view of the threaded insect trap, according to an embodiment of the present invention.
Figure 8:
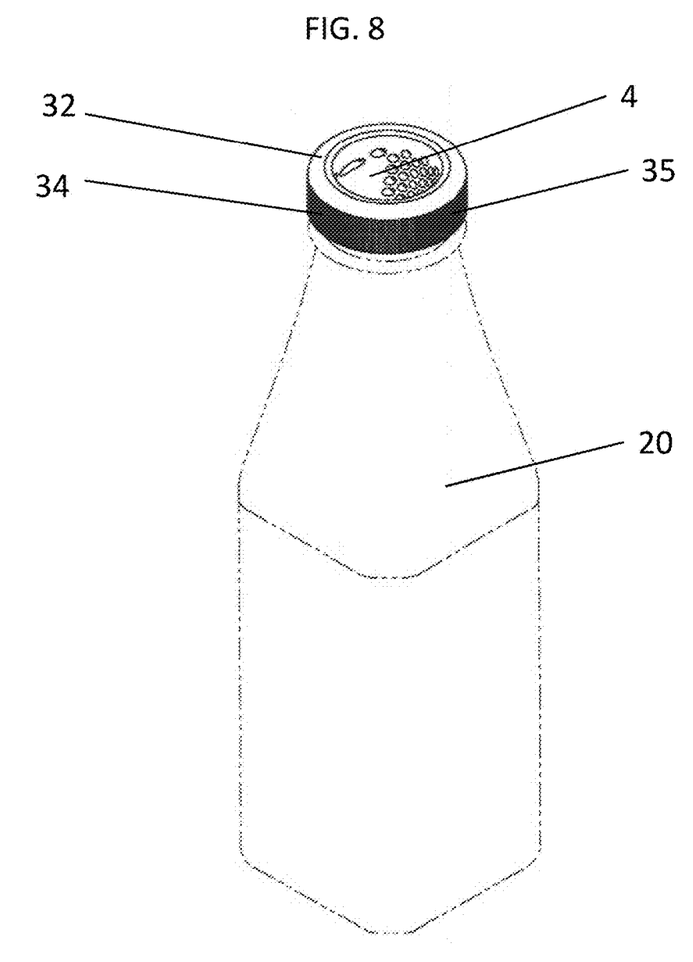
FIG. 8 is an elevation view of the threaded insect trap within a bottle, according to an embodiment of the present invention.
Figure 9:
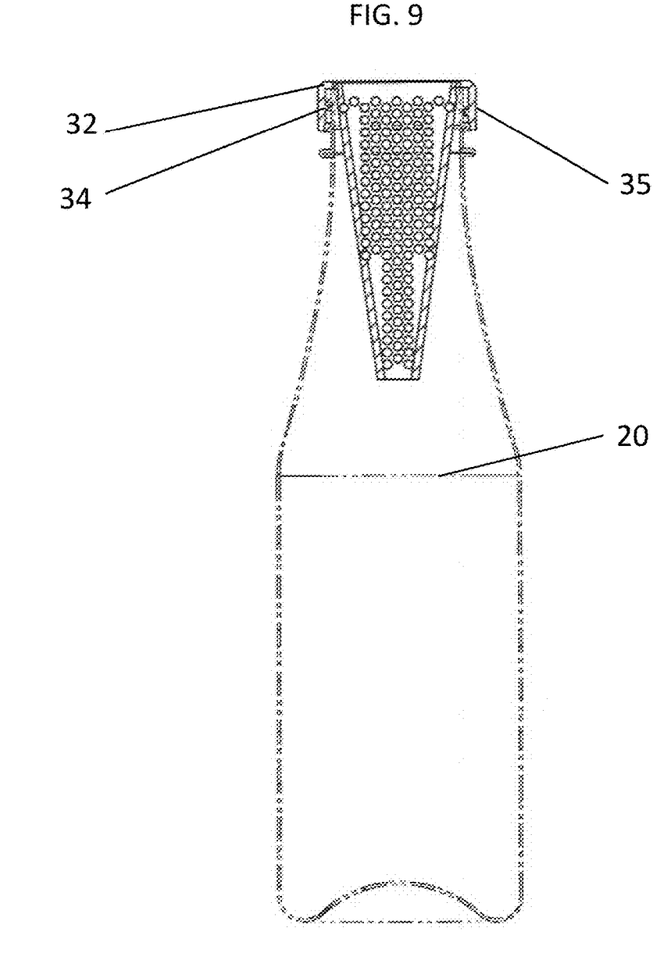
FIG. 9 is a cutaway view of the threaded insect trap within a bottle, according to an embodiment of the present invention.

With regards to FIG. 5 and FIG. 6, the upper lip 5 is sized so as to be slightly larger than the interior diameter of a typical bottle opening 22. The upper lip 5 fits over the edge of the bottle opening 22, and the body 15 of the trap is inserted into the bottle 20. When inserted, the ledge 19 and collar 17 compress to engage with the inside wall of the bottle opening 22 to keep the trap within the opening.

With reference to FIGS. 6-9, a further embodiment of the cone 30 engages with the threads of the bottle opening 22. It has a lip extension 32 extending out from, and hanging over, the collar 17, having threading inside the lip extension, to positively engage with threading around the bottle opening 22. On the exterior wall 34 of the extension 32 may be knurled 35 to help provide a grip in turning the cone 30.

The friction fit embodiment of the cone as well as the threaded embodiment are designed to allow bait or lure to be placed in plastic bottle or container, prepackaged, and sealed with a paper or plastic liner or wrapper, and/or additional seal, like a foil heat seal, over the upper opening 4. In an embodiment, the final product may be manufactured of a bottle 20 with approximately 1 ounce of non-toxic sugar base bait (not shown) in the bottle 20, a snap in cone 2 or screw in funnel cone 30 set within the bottle opening 22, and a plastic or paper layer sealed with a heat induction cap over the cone upper opening 4.

The trap may be made from materials (typically plastics) that enable addition of optical properties (including light) and scents.

With regards to optical properties, phosphorescence or photoluminescence is beneficial to attracting attention of insects during the day and at night. A chemical that produces phosphorescence is strontium aluminate, which may be combined into plastics, for example Polypropylene, polyethylene, PVC, EVA, PET, HDPE, to provide phosphorescence for a prolonged period. For many phosphorescent-based purposes, strontium aluminate is a vastly superior phosphor to its predecessor, copper-activated zinc sulfide (ZnS:Cu); it is about 10 times brighter and 10 times longer glowing, however it is about 10 times more expensive than ZnS:Cu and it cannot produce the unique red phosphorescence of the latter. It is frequently used in glow in the dark toys, where it displaces the cheaper but less efficient ZnS:Cu.

Different aluminates can be used as the host matrix. This influences the wavelength of emission of the europium ion. Strontium aluminate phosphors produce green and aqua hues, where green gives the highest brightness and aqua the longest glow time. The excitation wavelengths for strontium aluminate range from approximately 200 nm to 450 nm. The wavelength for its green formulation is approximately 520 nm, its blue-green version emits at approximately 505 nm, and the blue one emits at approximately 490 nm. Colors with longer wavelengths can be obtained from the strontium aluminate as well, though for the price of some loss of brightness.

Zinc Sulphide, an older technology, may be used instead of strontium aluminate, also in combination with certain plastics.

Color is also an optical property that may be controlled in the material of the trap. A number of wavelengths of light are particular attractive to insects, comprising colors commonly understood as yellow/green and blue, most frequently appearing between approximately 400 nm and 600 nm frequency. Preferred wavelengths for attractiveness for mosquito populations are green (approximately 530 nm), blue (approximately 490 nm) and white (combination of approximately 400 nm-700 nm) LEDs. The traps may therefore be manufactures of plastics that provide similar, desirable optical qualities. Phlebotominae (sand fly) may be a target insect of interest for the trap as well, and is highly attracted to light, both green (approximately 520 nm) and blue (approximately 490 nm), therefore traps designed to attract this fly will incorporate these wavelengths.

Certain scents are attractive to insects and may be injected or impregnated into plastic, for example, but not limited to, Polypropylene, polyethylene, polyvinyl chloride (PVC), ethylene-vinyl acetate (EVA), polyethylene terephthalate (PET), and high-density polyethylene (HDPE) to provide an emanation of the scent for a prolonged time period. Fragranced plastic is used in toys, air fresheners, film products, odor maskants, advertising promotional items, and other applications. The masterbatches are used in injection molding and film processes as supplied or diluted with virgin resin. Application resins include polyethylene, polypropylene, EVA, and flexible PVC.

Carbon Dioxide or $CO_2$ is known attractive lure for vectors specifically mosquitoes. Two known methods for naturally creating carbon dioxide are the combination of sugar, yeast and water as well as baking soda and vinegar, therefore these components may be added into the bottle to help attract vectors.

Octynol, also known as mushroom alcohol, is also attractive to mosquitoes. It is naturally-occurring in human breath and sweat. 1-Octen-3-ol is a secondary alcohol derived from 1-octene. It exists in the form of two enantiomers, (R)-(−)-1-octen-3-ol and (S)-(+)-1-octen-3-ol. Octynol compounds can be impregnated into liquid plastic (polyproplylene) in order to release the scent at a slow rate from the molded plastic insect trap. If made of other materials, the substances may be added to the materials.

Cyclopentanone is a proven attractant for mosquitoes, flies and other flying insects including vectors and may also be integrated into the plastic material of the cone.

Another compound that acts as an attractant to flies and bees and may be impregnated into plastic is (Z)-9-Tricosene, a sex pheromone produced by female house flies (*Musca domestica*) to attract males. In bees, it is one of the communication pheromones released during the waggle dance. As a pesticide, (Z)-9-tricosene is used in fly paper and other traps to lure male flies, trap them, and prevent them from reproducing. Products containing (Z)-9-tricosene are considered safe for humans, wildlife, and the environment, and may be added to the material of the insect trap for a slow release of the pheromones from the insect trap.

Figure 1A:
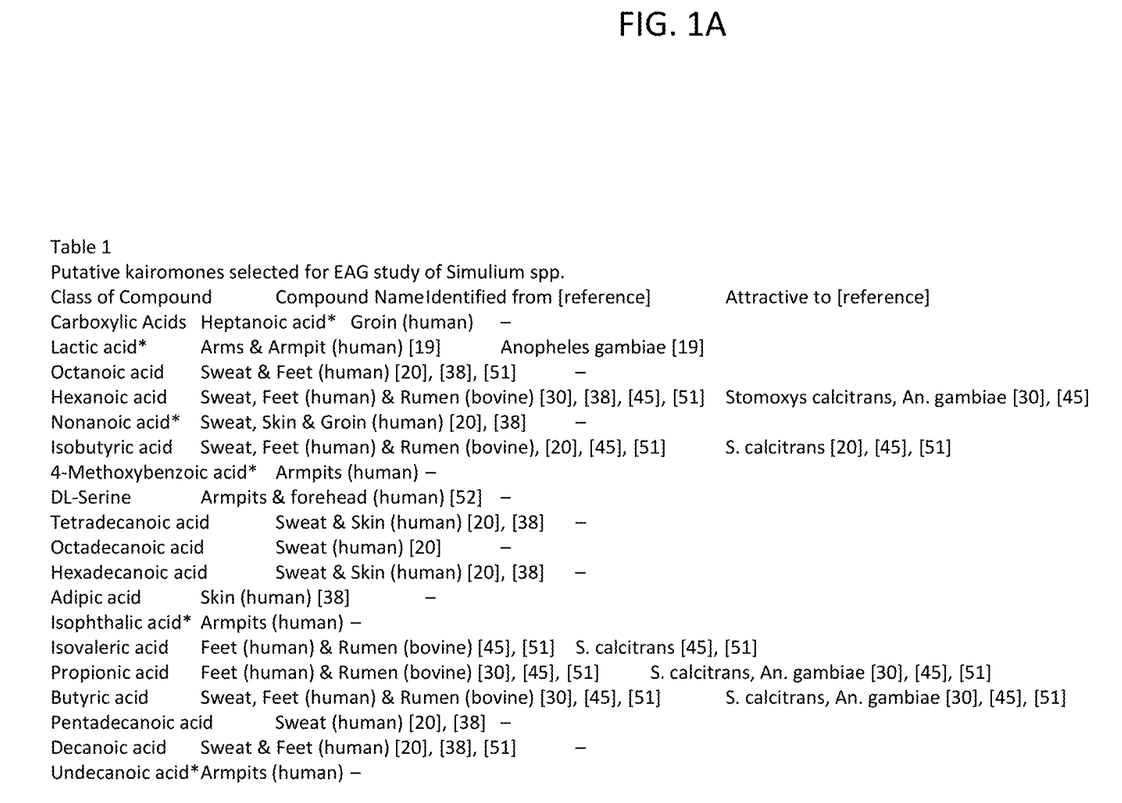
Figure 2:
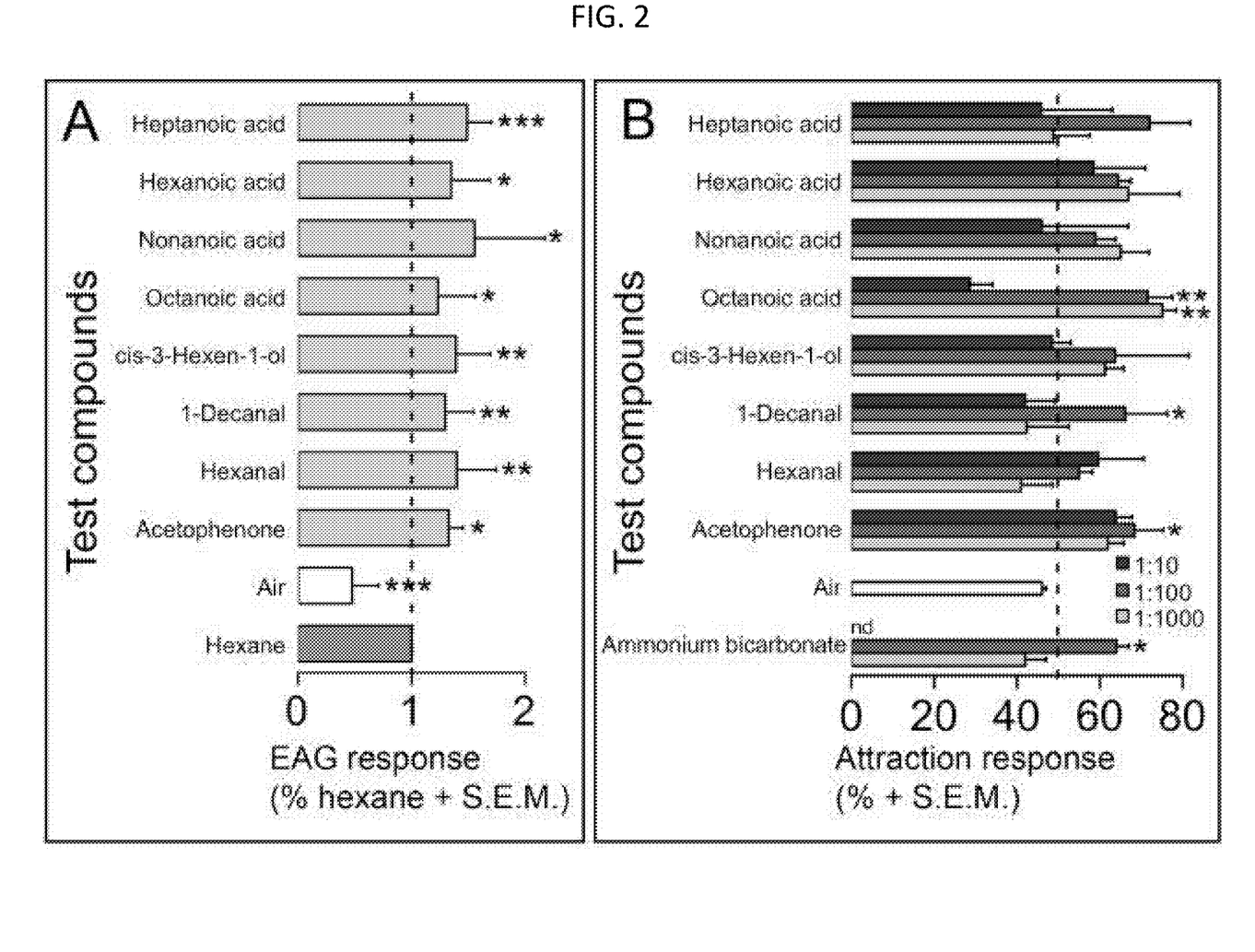
FIG. 2 is a graph showing attraction responses of vectors, according to an embodiment of the present invention.

Sweat is also attractive to insects like mosquitoes and other vectors, and particular compounds may be especially attractive to vectors, and may be impregnated into the plastic of the trap. Dissolved in the water are trace amounts of minerals, lactic acid, and urea. Although the mineral content varies, some measured concentrations are: sodium (0.9 gram/liter), potassium (0.2 g/l), calcium (0.015 g/l), and magnesium (0.0013 g/l). Also, many other trace elements are excreted in sweat, again an indication of their concentration is (although measurements can vary fifteenfold) zinc (0.4 milligrams/liter), copper (0.3-0.8 mg/l), iron (1 mg/l), chromium (0.1 mg/l), nickel (0.05 mg/l), and lead (0.05 mg/l). Probably many other less-abundant trace minerals leave the body through sweating with correspondingly lower concentrations. Some exogenous organic compounds make their way into sweat as exemplified by an unidentified odiferous "maple syrup" scented compound in several of the species in the mushroom genus *Lactarius*. In humans, sweat is hypoosmotic relative to plasma (i.e. less concentrated). Sweat typically is found at moderately acidic to neutral pH levels, typically between 4.5 and 7.0. The components of sweat may be added to the plastic composition of the insect trap in order to better attract vectors. Table 1 (FIG. 1) includes other compounds that may be used within the plastic or other components of the insect trap, so as to be released slowly and attract insects (vectors).

Another compound that may be added to the material of the insect trap is Acetophenone, an organic compound with the formula $C_6H_5C(O)CH_3$ (also represented by the letters PhAc or BzMe). It is the simplest aromatic ketone. This colorless, viscous liquid is a precursor to useful resins and fragrances. It is particularly attractive to certain species of mosquitoes.

Some vectors are attracted to nectars, and sugars and nectars may be inserted into the trap. Vectors can and may be impregnated or injected into the plastic of the cone itself, before molding. Examples of scents that may be impregnated are mango, agave, apple and Cedrol oil.

Nectar is a sugar-rich liquid produced by plants in glands called nectaries, either within the flowers with which it attracts pollinating animals, or by extrafloral nectaries, which provide a nutrient source to animal mutualists, which in turn provide antiherbivore protection. Common nectar-consuming pollinators include mosquitoes, hoverflies, wasps, bees, butterflies and moths, hummingbirds, and bats. Nectar plays an important role in the foraging economics and overall evolution of nectar-eating species; for example, nectar and its properties are responsible for the differential evolution of the African honey bee, A.m. scutellata, and the western honey bee.

Nectar is an ecologically important item, the sugar source for honey. It is also useful in agriculture and horticulture because the adult stages of some predatory insects feed on nectar. For example, the social wasp species *Apoica flavissima* relies on nectar as a primary food source. In turn, these wasps then hunt agricultural pest insects as food for their young.

Attractive Sugar Baits (ASB) may be used to attract vectors such as flies, yellow jacket wasps, hornets, wasps, mosquitoes and other vectors and flying insects. These may be food grade sugar based, safe for use around children and pets, and in food preparation areas. The prior art discloses Attractive Toxic Sugar Baits, however toxins may have adverse affects on the health of humans or animals. Toxins are not necessary in the present invention as the invention traps the insect inside, however the ASB can be positioned within the trap to increase the attractiveness of the interior of the trap. In an embodiment, a disposable bottle trap is pre-baited with our non-toxic ASB bait and sealed with tamper proof seal. Our reusable window trap includes a bottle of non-toxic ASB bait for use at time of placement.

Mango and Agave scents are particularly of interest based on multiple tests, wherein the nectar based fruit scents proved to be attractive and sweet. Floral scents are also beneficial to attracting vectors and sweet scents also work to attract vectors.

Cedrol, a sesquiterpene alcohol, is the first identified oviposition attractant for African malaria vectors. Cedrol may be a fungal metabolite and the essential oil of grass rhizomes have been described to contain a high amount of different sesquiterpenes. Cedrol is an attractant to vectors, and may be combined/integrated into the cone material.

The snap in or screw in cone is designed to be used with plastic bottles (PET, HDPE, PP, PLA, PVC) ranging in bottle neck size diameters of 18 mm, 20 mm, 22 mm, 24 mm, 28 mm, 33 mm, 38 mm, 43 mm, 45 mm, 48 mm, 53 mm, and 58 mm.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. An insect trap comprising:
   an enclosure for holding insects, and an insert for insertion into an opening of the enclosure, the insert having an upper opening and a frusto-conical end defining a lower opening, joined by sidewalls; the sidewalls including a plurality of apertures;
   wherein the insert is a plastic or polymer and includes a scent, a phosphorescent, or a photoluminescent compound impregnated or injected in the plastic or polymer and the scent, phosphorescent, or photoluminescent compound is strontium aluminate or zinc sulfide.

2. The insect trap as recited in claim 1 further including means for securing the insert within the enclosure.

3. The insect trap as recited in claim 2 wherein the means for securing the insert within the enclosure comprises threads on the insert for engaging corresponding threads on the enclosure.

4. The insect trap as recited in claim 2 wherein the means for securing the insert within the enclosure comprises a ledge, extending around and from a sidewall around the circumference of an outer surface of the insert, for creating a friction fit with an interior diameter of the opening of the enclosure.

5. The insect trap as recited in claim 1 wherein the insert is in the shape of a right circular cone with a frusto-conical end.

6. The insect trap of claim 1 wherein the plurality of apertures are perforations permeating at least one section of the insert comprising at least one half of the surface area of the insert.

7. The insect trap as recited in claim 1 wherein the conically-shaped insert further includes an upper lip around the upper opening of the insert.

8. The insect trap as recited in claim 7 wherein the enclosure is a bottle having an opening with a circular diameter.

9. The insect trap as recited in claim 8 wherein the lip is configured to fit over an edge of the opening of the bottle.

10. An insect trap comprising:
    an enclosure for holding insects, and an insert for insertion into an opening of the enclosure, the insert having an upper opening and a frusto-conical end defining a lower opening, joined by sidewalls; the sidewalls including a plurality of apertures wherein the insert is a plastic or polymer and the sidewalls include a phosphorescent or photoluminescent compound impregnated or injected in the plastic or polymer and the scent, photsphorescent, or photoluminescent compound is strontium aluminate or zinc sulfide.

11. The insect trap as recited in claim 10 wherein the plastic or polymer is selected from the group consisting of polypropylene, polyethylene, polyvinyl chloride (PVC), ethylene-vinyl acetate (EVA), polyethylene terephthalate (PET), high-density polyethylene (HDPE) and a combination thereof.

12. The insect trap of claim 1, wherein the scent is an insect attracting lure, selected from the group consisting of: octynol, cylopentanone and a combination thereof.

13. The insect trap of claim 1, wherein the scent is selected from the group consisting of: (Z)-9-Tricosene or acetophenone.

14. The insect trap of claim 1, wherein the scent is Cedrol.

15. The insect trap of claim 1, wherein a phosphorescent or photoluminescent compound is included within the plastic or polymer.

16. The insect trap of claim 1 wherein the scent is selected from the group consisting of: mango, agave, apple, floral, or Cedrol oil.

17. An insect trap comprising:
    an enclosure for holding insects, and an insert for insertion into an opening of the enclosure, the insert having an upper opening and a frusto-conical end defining a lower opening, joined by sidewalls; the sidewalls including a plurality of apertures;
    wherein the insert is a plastic or polymer and includes a phosphorescent or photoluminescent compound impregnated or injected in the plastic or polymer, wherein the phosphorescent or photoluminescent compound comprises strontium aluminate or zinc sulfide.

18. The insect trap of claim 1, wherein the phosphorescent or photoluminescent compound is injected or impregnated into the plastic or polymer and is an aluminate.

19. The insect trap of claim 1, wherein the scent, the phosphorescent compound, or the photoluminescent compound is injected or impregnated into the plastic or polymer before molding.

* * * * *